United States Patent [19]

Conn

[11] Patent Number: 4,954,184

[45] Date of Patent: Sep. 4, 1990

[54] SOLDER TINNING PASTE FOR AUTOMOLBILE APPLICATION

[75] Inventor: Paul J. Conn, Grand Island, N.Y.

[73] Assignee: S. A. Day Manufacturing Co., Inc., Buffal, N.Y.

[21] Appl. No.: 353,340

[22] Filed: May 17, 1989

[51] Int. Cl.$^5$ ............................................. B23K 35/34
[52] U.S. Cl. ......................................... 148/24; 148/26
[58] Field of Search ................................... 148/24, 26

[56] References Cited

U.S. PATENT DOCUMENTS 2,547,771  4/1951  Pessel ..................................... 148/24

Primary Examiner—Peter D. Rosenberg

Attorney, Agent, or Firm—Edwin T. Bean, Jr.; Martin G. Linihan; John C. Thompson

[57] ABSTRACT

A new and improved solder tinning paste composition suitable for use as an underlay for metallic solder when solder filling base metal braze joints to facilitate formation of the solder joint between the base metals. The paste composition comprises substantially pure tin powder, suspending agent, inorganic based flux and solvent. Optionally, the paste composition may comprise a deoxidizing agent, a soil removing agent and a surfactant.

The solder tinning paste exhibits enhanced flowing and wetting characteristics and a lower melting point. In another aspect thereof, the present invention provides a process for formulating the foregoing solder paste composition.

21 Claims, 1 Drawing Sheet

SOLDER TINNING PASTE FOR AUTOMOLBILE APPLICATION

FIELD OF THE INVENTION

This invention relates generally to metallic solders and, more particularly, to a new and improved solder tinning paste composition suitable for use as an underlay for metallic solder when solder filling base metal braze joints to facilitate formation of the solder joint therebetween.

BACKGROUND OF THE INVENTION

In the manufacture of automobiles, the upper and lower body modules are constructed separately and then permanently joined together by brazing. Thereafter, metallic solders are used to fill depressions located along the brazed seams. For example, metallic solder is applied to the groove where the back windshield of the upper module was brazed to the lower module. However, during the process of filling base metal braze joints, metallic solder will not adequately adhere to the brazed surfaces. Accordingly, a solder tinning paste or solder cream is incorporated as an underlay between the solder and the base metal surfaces thereby facilitating adherence of the solder and formation of the solder joint.

Solder tinning pastes or creams generally comprise a compound which prepares the surface by cleaning, fluxing and tinning such that the metallic solders will readily adhere thereto. That is, tinning pastes or creams generally are composed of a solder powder suspended within a liquid system which contains flux in a viscosity adjustment material. The quantity of the liquid system in relationship to the total prepared volume of solder tinning paste is defined by weight percentage. For example, an 80% solder tinning paste contains 80% metal in 20% non-metal liquid system.

It is important that the tinning paste conform to the requirements established by the particular process since flux and metal percentages can impact the reliability of the solder joint interconnection between the base metals. Accordingly, various tinning paste alloys are currently available for particular applications. One such solder tinning paste currently available and utilized in the automobile assembly process is an alloy composition containing 85% tin and 15% copper suspended in a zinc chloride flux. Specifically, the composition contains the following: tin-copper alloy, zinc chloride, muriatic acid, Stagum Type 1 (suspending agent), n. butyl Cellosolve and Sterox DJ (wetting agent). Although the tin-copper alloy composition is generally adequate as a solder tinning paste the composition contains impurities such as oxides and has a high workable melting point of 779°0 F.

Furthermore, solder tinning pastes are used to fill dents inadvertently placed in the automobile during assembly of the car on the line. Also, some tinning paste compositions will not readily adhere on top of galvanized surfaces. Therefore, it would be desirable to provide a solder tinning paste easily spreadable at ambient temperature and having less impurities, a lower melting point and enhanced wetting and flowing characteristics at soldering temperatures comparable to the currently available tin-copper alloy paste.

OBJECTS AND SUMMARY OF THE INVENTION

Accordingly, it is a primary object of the present invention to provide a new and improved solder tinning paste composition suitable for use as an underlay for metallic solder when solder filling base metal braze joints to facilitate formation of the solder joint therebetween.

It is a further object of the present invention to provide a solder paste which exhibits enhanced flowing and wetting characteristics and a lower melting point comparable to the tin-copper alloy paste currently used in the industry.

It is a further object of the present invention is to provide a paste composition which can be applied on top of galvanized surfaces.

It is a further object of the present invention to provide a paste composition containing a minimal amount of impurities.

It is a more particular object of the present invention to provide a paste composition which is workable at ambient temperature.

It is a more particular object of the present invention to provide a paste composition which is easily incorporated into seams between base metals, or in a surface to fill a dent therein.

The present invention provides a solder tinning paste composition suitable for use as an underlay for metallic solder when solder filling base metal braze joints to facilitate formation of the solder joint between the base metals, the paste comprising by weight:

from about 35% to about 85% tin powder;
from about 0.25% to about 3.0% suspending agent;
from about 4.0% to about 15.0% inorganic based flux; and
from about 10.0% to about 40.0% solvent.

The above solder paste composition may also comprise by weight:

from about 1.0% to about 6.0% deoxidizer
from about 0.5% to about 6.0soil remover; and
from about 0.1% to about 2.0% surfactant.

The solder paste of the present invention exhibits enhanced flowing and wetting characteristics and a lower melting point. In another aspect thereof, the present invention provides a process for formulating the foregoing solder paste composition.

DETAILED DESCRIPTION OF THE INVENTION

Figure 1:
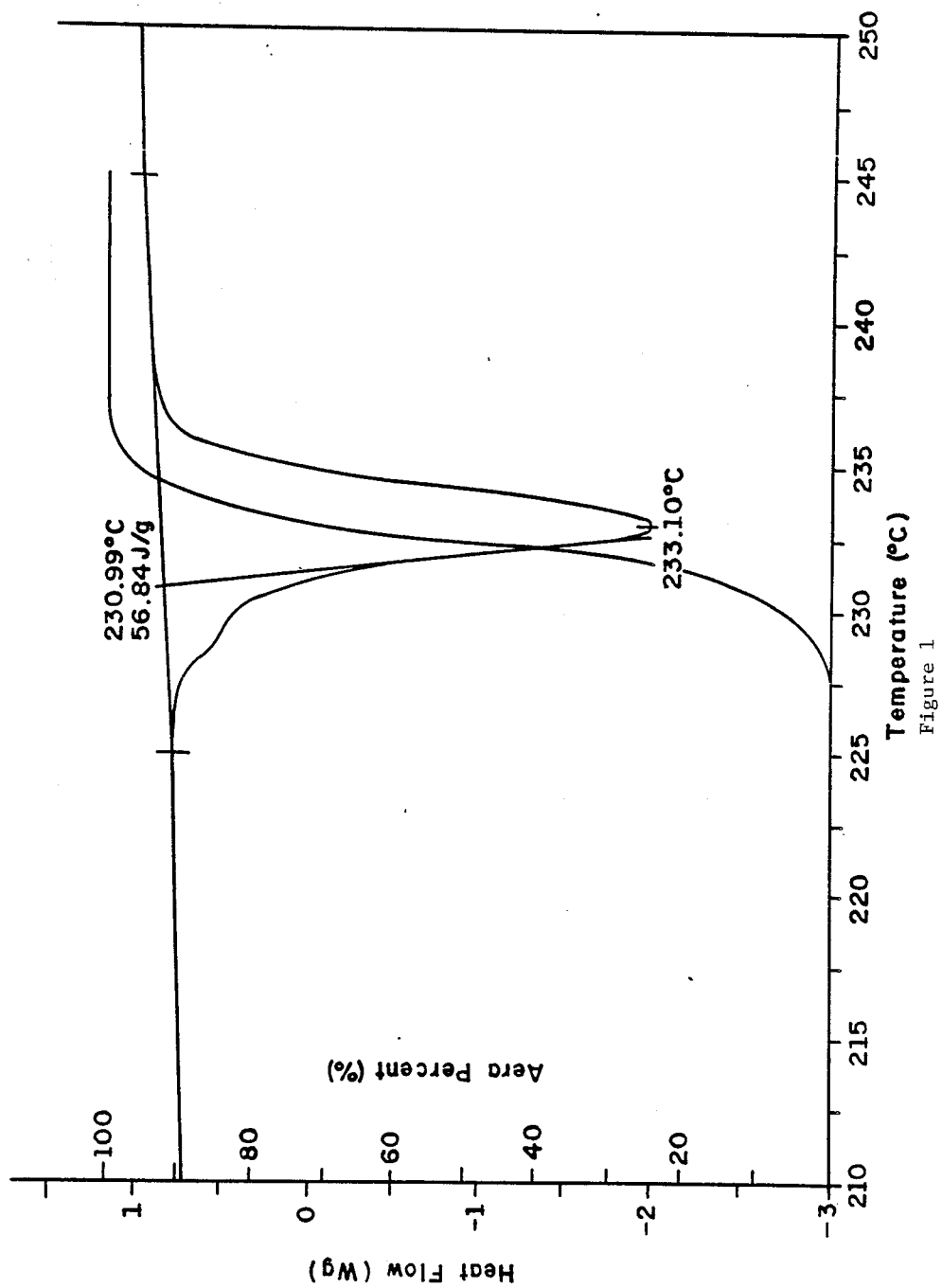
FIG. 1 discloses a DSC thermogram showing the liquidus and solidus of the paste composition of the present invention.

The term "solder tinning paste" as used herein, refers to a composition which prepares a base metal surface by cleaning, fluxing and tinning such that a metallic solder will readily adhere to the prepared surface.

The term "base metal" or "base metals" as used herein, refers to any metal capable of being soldered, and more preferably, to those metals commonly used in the automobile industry. The "base metal" may comprise welded, brazed or galvanized surfaces. The braze material generally being bronze and the base metal steel.

The invention is directed to an improved solder tinning paste composition suitable for use as an underlay for metallic solder when solder filling base metal braze joints to facilitate formation of the solder joint therebetween. The paste composition of this invention is essentially free from incidental impurities and contains tin powder, suspending agent, inorganic based flux and solvent. Optionally, one or more additives may be added from the group consisting of deoxidizing agent, soil removing agent and surfactant.

The tin powder component of the paste composition is 99.9% pure tin (type A trade designation) supplied by Alcan Powders and Pigments, 901 Lehigh Avenue, Union, N.J. The tin powder contains trace amounts of less than 0.01% zinc, 0.04% copper and 0.03lead and has a density of 3.35 grams/cc. Specifically, Table A shows an Inductively Coupled Plasma Emission Spectroscopy analysis of the solder component i.e., tin, of the solder paste composition. The composition was boiled in hot water and the solder allowed to settle. The flux solution was decanted off. This was repeated five times to wash the solder (tin) free of flux.

TABLE A

| Solder Composition | Percent by wt. |
| --- | --- |
| Copper | 0.067 |
| Zinc | less than 0.005 |
| Antimony | 0.0069 |
| Lead | 0.029 |
| Iron | 0.0047 |
| Bismuth | 0.018 |
| Nickel | 0.0052 |
| Aluminum | less than 0.003 |
| Cadmium | less than 0.0004 |
| Arsenic | 0.022 |
| Tin | remainder |

Accordingly, the minimal amount of trace metal and the absence of copper reduces the amount of impurities such as oxides present when the paste composition is heated. Furthermore, the paste composition has a significantly lower melting point than the tin-copper alloy paste because 99.9& pure tin powder having only trace amounts of copper is used in the paste composition of the present invention. The powder is a homogeneous product free of lumps such that 95.5% of the powder is less than 325 mesh. The tin powder will comprise at least 35% to about 85% by weight, and most preferably 53.37% by weight of the total composition.

The flux component of the paste composition generally is inorganic based since organic based fluxes could be carcinogenic and leave black carbon chars when heated above 700° F. The carbon chars could interfere with the painting operation and prevent formation of a smooth tin surface. Furthermore, organic fluxes such as rosin are not preferred since rosin forms abiatic acid when heated. Typical inorganic based fluxes include zinc chloride and zinc bromide. Table B shows an Inductively Coupled Plasma Emission Spectroscopy analysis of the flux component of the solder paste composition. An aqueous solution of flux containing 20.2 grams of flux/1000 ml was analyzed.

TABLE B

| Flux Composition | Percent by wt. |
| --- | --- |
| Zinc | 0.14 |
| Sodium | 0.0003 |
| Potassium | 0.0001 |
| Manganese | 0.0003 |
| Tin | 0.0097 |
| Sulfur | 0.0006 |
| Silicon | 0.0001 |
| Calcium | 0.0001 |
| Also determined using additional test methods: | |

TABLE B-continued

| Flux Composition | Percent by wt. |
| --- | --- |
| Chloride as Cl (FLTM AK 115-1) | 7.8 |
| Combined ammonia as $NH_3$ (FLTM AK 108-1) | 0.2 |
| Water-miscible solvent ml/100 g (FLTM AK 117-1) | 7.0 |
| Water (ASTM D 95) | 77.7 |
| pH, 2% solution by wt., 25 C (ASTM E 70) | 3.5 |

Preferably, zinc chloride will comprise at least 4.0% to about 15% by weight, and most preferably 13.53% by weight of the total composition. The flux component promotes the fusing of the metals and prevents formation of oxides on the metal surfaces. If the flux component is less than 4% the flux may not deoxidize the metals. Flux component greater than 15% could leave halide residues. It is noted that zinc chloride volatilizes at about 1100° F. and if the metal part was above that temperature the halides could volatilize.

The suspending agent component of the paste composition suspends the particles in the composition and thus the density i.e., grams per unit, of the suspending agent present in the composition is critical since the suspending agent determines the viscosity of the paste. Accordingly, if the paste composition is too viscous the paste becomes stiff and hard to spread, and if the paste is not viscous enough the metals will precipitate out of the composition. Further, it is important that the suspending agent used in the present invention be compatible with acids because a suspending agent compatible in alkaline conditions will precipitate or gum out in the paste composition of the present invention. It was determined that the suspending agent be present in an amount sufficient to give a viscosity reading of 3/16" Ford cup having a first break time of about 20-23 seconds.

The preferred suspending agent is selected from the family of industrial gums and is in the form of naturally occurring polysaccharides or modified polysaccharides which includes the water-soluble or water-swellable derivatives of cellulose and the derivatives or modifications of other polysaccharides or their derivatives, that when dispersed in water at low dry-substance content, swell to produce gels, highly viscous dispersions, or solutions. The most preferred gum for use as a suspending agent is an anionic heteropolysaccharide such as xanthan gum. Xanthan gum is supplied under the name Meretec #30 by Meer, 9500 Railroad Avenue, North Bergen, N.J. Xanthan gum is a cream-colored powder that dissolves in either hot or cold water to produce solutions with high viscosity at low concentrations. Xanthan gum is produced by industrial fermentation by culturing the the microorganism *Xanthomonas campestris* purely under aerobic conditions in a medium containing commercial glucose, a suitable nitrogen source, dipotassium phosphate, and appropriate essential elements. When fermentation is complete, the gum is recovered from the fermentation broth by precipitation with isopropyl alcohol. The structure of xanthan gum consists of a beta-(1-4)-linked D-glucopyranosyl backbone chain, e.g., in cellulose. To the chain are appended trisaccharide side chains composed of D-mannopyranosyl and D-glucopyranosyluronic acid residues. The beta-(1-2) mannosyl residues have 6-0-acetyl substituents, and about half of the beta-D-mannosyl end groups bear 4,6-0-(1-carboxyethylidene) substituents, i.e., 4,6-acetal-linked pyruvic acid. The suspending agent i.e., xanthan gum, will comprise at least 0.25% to about 3% by weight, and most preferably 0.48% by weight of the total composition. If the suspending agent comprises an amount less than 0.25% by weight the metals will precipitate out of the composition. If the suspending agent comprises an amount greater than 3.0% by weight the paste becomes too stiff. Although the preferred suspending agent is xanthum gum, other polysaccharide gums may be utilized. In addition, any gum having all the requisite properties noted above may be substituted.

Optionally, a deoxidizing agent, a soil removing agent and a surfactant may also be added to the paste composition. The deoxidizing agent deoxidizes the surface of the base metals. Typical deoxidizing agents include muriatic acid, hydrobromic and phosphoric acid. The preferred deoxidizer is muriatic acid and will comprise at least 1% to about 6% by weight, and most preferably 3.41% by weight of the total composition. If the deoxidizer component comprises an amount greater than 6% corrosive halides could remain on the base metal. If the deoxidizer comprises an amount less than 1% the base metals will not be deoxidized.

The soil removing component of the paste composition generally includes glycol ethers or liquid degreasers. Typical glycol ethers include n. butyl Cellosolve, propylene glycol ether and monoethanolomine. Preferably, n. butyl Cellosolve will comprise at least 0.5& to about 6% by weight, and most preferably 1.74% by weight of the total composition. If the soil remover comprises an amount in excess of 6% organic residue chars will remain on the metal surfaces.

The surfactant component of the paste composition is selected from the Igepal series of biodegradeable nonionic surfactants and is used as a wetting agent. The Igepal surfactants are a series of alkylphenoxypoly(oxyethylene)ethanols resulting from the combination of an aklyphenol with ethylene oxide. The general chemical formula for alkylphenoxypoly(oxyethylene)ethanols is $RC_6H_4O(CH_2CH_2O)_nCH_2CH_2OH$ in which R maY be $C_8H_{17}$ or a higher homolog. The preferred Igepal surfactant is Igepal RC-620 supplied by the GAF Corp., 140 W. 51st Street, New York, N.Y. The chemical formula for Igepal RC-620 is poly(oxy-1.2-ethanediyl)alpha-(dodecylphenyl)omega-hydroxy. The molecular formula for Igepal RC-620 is $(C_2H_4O)_nC_{18}H_{30}O$ where n=10. Igepal RC-620 will comprise at least 0.1% to about 2% by weight, and most preferably 0.12% by weight of the total composition. It is understood that any known surfactant having similar wetting characteristics as Igepal RC-620 may be substituted herein. Since the paste composition must exhibit satisfactory wetting and flowing characteristics the above ranges of surfactant yield the lowest surface tension which optimizes flowing characteristics. In this connection, it was determined that the paste composition of the present invention advantageously spreads 12% further than the copper tin alloy paste composition because: (1) the melting point is lowered about 330° F. allowing quicker application and does not set up as fast as the higher melting tin copper; (2) the tin wets more easily and sheers thinner for more coverage; and (3) the tin is lighter than the tin copper so it will cover more area per pound.

The remainder of the paste composition will comprise a known solvent, typically water. The preferred solvent being zeolite softened or demineralized water and will comprise at least 10% to about 40% by weight, and most preferably 27.34% by weight of the total composition.

The following table sets forth a preferred formulation for the paste composition of the present invention wherein the compositional ranges of the various components are by weight percent of the total composition.

TABLE C a. From about 5% to about 85% tin powder:
b. From about 4% to about 15% inorganic flux;
c. From about 0.25% to about 3% suspending agent;
d. From about 1% to about 6% deoxidizer;
e. From about 0.5% to about 6% soil remover;
f. From about 0.1% to about 2% surfactant; and
g. Balance aqueous solvent.

The following table sets forth a more preferred formulation for the paste composition of the present invention wherein the compositional ranges of the various components are by weight percent of the total composition.

TABLE D a. From about 35% to about 85% tin powder:
b. From about 4% to about 15% zinc chloride;
c. From about 0.25% to about 3% polysaccharide gums;
d. From about 1% to about 6% muriatic acid;
e. From about 0.5% to about 6% glycol ether;
f. From about 0.1% to about 2% surfactant; and
g. Balance aqueous solvent.

The following table sets forth a still more preferred formulation for the paste composition of the present invention wherein the compositional ranges of the various components are by weight percent of the total composition.

TABLE E a. About 53.37 percent tin powder:
b. About 13.53 percent zinc chloride;
c. About 0.48 percent Meretec #30;
d. About 3.41 percent muriatic acid;
e. About 1.74 percent n. butyl Cellosolve;
f. About 0.12 percent Igepal RC-620; and
g. Balance solvent; preferably zeolite softened or demineralized water.

Table F sets forth the total composition of the solder and flux components of the solder paste composition in percent by weight.

TABLE F

| Composition | wt. % |
| --- | --- |
| Water Insolubles (solder) (ASTM D 4055, modified water, 0.6 micron filter) | 47.5 |
| Water Solubles (flux) (obtained by difference) | 52.5 |

Infrared Spectrophotometry analysis of the paste composition yielded the following results: (1) spectrograms of the non-volatiles of the flux which are believed characteristic of inorganic material containing chloride; (2) spectrograms of the water-miscible solvent which are believed characteristic of an ether alcohol, possibly n. butyl Cellosolve; and (3) spectrograms of waterinsoluble material isolated from the flux which are believed characteristic of inorganic material.

The paste composition was also tested for liquidus and solidus properties by DSG. DSG heating curves were generated for the samples after calibrating the DSG cell base with secondary (Indium) and primary (Tin) NBS standards. Liquidus and solidus temperatures for the samples of the paste composition tested are shown in FIG. 1. All samples were heated to 280 C. to check for higher melting temperatures. None were observed in any of the samples.

Furthermore, the paste composition of the present invention will readily adhere on top of galvanized surfaces. Galvanized materials generally comprises zinc on the surface thereof which prevents the material from being receptive to solder pastes. However, a portion of the muriatic acid component of the paste composition of the present invention apparently remains a free acid which acts to remove the zinc from the galvanized surface thereby making the surface receptive to the paste.

The formulation and application of the paste composition of the present invention will become more apparent with reference to the following examples.

EXAMPLE 1

Example 1 was prepared, by weight, as follows

| water | 10,075 mls | 27.05% |
| Meretec #30 | 190 grams | .51% |
| muriatic acid | 1,125 mls | 3.63% |
| zinc chloride | 2,975 mls | 14.38% |
| n. butyl Cellosolve | 675 mls | 1.85% |
| Igepal RC-620 | 115 mls | .13% |
| tin powder | 43 pounds | 52.46% |

The paste formulation of Example 1 was prepared by first adding 10,075 milliliters of demineralized water and 190 grams of Meretec #30 into a suitably sized container. The water and suspending agent was mixed for approximately 15 minutes until a viscosity of 3/16' Ford cup having a first break time of 20-23 seconds was obtained. Thereafter, 1,125 milliliters of muriatic acid was added to the container and mixed with the water and suspending agent. Then, 2,975 milliliters of zinc chloride, 675 milliliters of n. butyl Cellosolve, 115 milliliters of Igepal RC-620 and 43 pounds of tin powder was added to the container in the order listed. Thereafter, the paste formulation was mixed at a speed of approximately 450-525 rpm for ten minutes at ambient temperature using an industrial lightning mixer. The paste composition was packaged into two pound containers ready for use having a shelf life once seated of 3-4 months.

EXAMPLE 2

Example 2 was prepared, by weight, as follows

| water | 10,825 mls | 27.34% |
| Meretec #30 | 190 grams | .48% |
| muriatic acid | 1,125 mls | 3.41% |
| zinc chloride | 2,975 mls | 13.53% |
| n. butyl Cellosolve | 675 mls | 1.74% |
| Igepal RC-620 | 115 mls | .12% |
| tin powder | 46.5 pounds | 53.37% |

The paste formulation of Example 2 was prepared by first adding 10,825 milliliters of demineralized water and 190 grams of Meretec #30 into a suitably sized container. The water and suspending agent was mixed for approximately 15 minutes until a viscosity of 3/16' Ford cup having a first break time of 20-23 seconds was obtained. Thereafter, 1,125 milliliters of muriatic acid was added to the container and mixed with the water and suspending agent. Then, 2,975 milliliters of zinc chloride, 675 milliliters of n. butyl Cellosolve, 115 milliliters of Igepal RC-620 and 46.5 pounds of tin powder was added to the container in the order listed. Thereafter, the paste formulation was mixed at a speed of approximately 450-525 rpm for ten minutes at ambient temperature using an industrial lightning mixer. The paste composition was packaged into two pound containers ready for use having a shelf life once seated of 3-4 months.

EXAMPLE 3

The solder paste composition in accordance with the formulation described above in Example 2 was applied with a paint brush to the grove where the back windshield of the upper module of an automobile body was brazed to the lower module. The applied paste was heated to a temperature of about 449° F. using a gas torch at which temperature the paste melted and formed black colored beads. The beads were spread across the metal surface using a cloth to give a grit uniform surface of paste along the brazed metal surface. Thereafter, a lead-free solder stick was melted onto the metal surface and trowelled on using a wood paddle heated with a torch and applied to a paddle lube water soluble wax which prevents the solder from sticking to the paddle to form a uniform surface of solder.

EXAMPLE 4

The solder paste composition in accordance with the formulation described above in Example 2 was applied to dents inadvertently placed in the automobile body during assembly using a trowel, whereupon the paste was allowed to harden, and thereafter, was lightly sanded to facilitate a smooth uniform surface on the automobile body prior to painting. Thus, in this example the paste is used in the manner of a body filler.

It will be understood that the foregoing description and illustration is by way of example only and that such modifications and changes as may suggest themselves to those skilled in the art are intended to fall within the scope of the present invention as defined by the appended claims.

What is claimed is:

1. Solder tinning paste composition suitable for use as an underlay for metallic solder when solder filling base metal braze joints to facilitate formation of the solder joint between the base metals, said paste exhibiting a melting point lower than 450° F., said paste consisting essentially of:
   from about 35.0 weight percent to about 85.0 weight percent substantially pure tin powder;
   from about 0.25 weight percent to about 3.0 weight percent suspending agent;
   from about 4.0 weight percent to about 15.0 weight percent inorganic based flux; and
   from about 10.0 weight percent to about 40.0 weight percent solvent.

2. A solder tinning paste composition suitable for use as an underlay for metallic solder when solder filling base metal braze joints to facilitate formation of the solder joint between the base metals, said paste comprising by weight:

from about 35.0% to about 85.0% tin powder;
from about 0.25% to about 3.0% suspending agent;
from about 4.0% to about 15.0% inorganic based flux; and
from about 10.0% to about 40.0% solvent.

3. The composition of claim 2, wherein said paste further comprises by weight:
from about 1.0% to about 6.0% deoxidizer;
from about 0.5% to about 6.0% soil remover; and
from about 0.1% to about 2.0% surfactant.

4. The composition of claim 2, wherein said inorganic based flux is selected from the group consisting of zinc chloride or zinc bromide.

5. The composition of claim 2, wherein said suspending agent is a polysaccharide gum.

6. The composition of claim 5, wherein said gum is an anionic heteropolysaccharide.

7. The composition of claim 6, wherein said anionic heteropolysaccharide is xanthan gum.

8. The composition of claim 2, wherein said solvent is an aqueous-based solvent.

9. The composition of claim 8, wherein said aqueous-based solvent is water.

10. The composition of claim 3, wherein said deoxidizer is selected from the group consisting of muriatic acid, phosphoric acid or hydrobromic acid.

11. The composition of claim 3, wherein said soil remover is a glycol ether.

12. The composition of claim 11, wherein said glycol ether is selected from the group consisting of n. butyl Cellosolve, propylene glycol ether or monoethanolomine.

13. The composition of claim 12, wherein said glycol ether is n. butyl Cellosolve.

14. The composition of claim 3, wherein said surfactant is a wetting agent.

15. The composition of claim 3, wherein said surfactant is an alkylphenoxypoly(oxyethylene)ethanol.

16. The composition of claim 15, wherein said alkylphenoxypoly(oxyethylene)ethanol is Igepal RC-620.

17. The composition of claim 2, wherein at least 95.5% of said tin powder is finer than 325 mesh.

18. The composition of claim 3, wherein said paste readily adheres on top of galvanized surfaces.

19. A solder paste composition suitable for use as an underlay for metallic solder when solder filling base metal braze joints to facilitate formation of the solder joint between the base metals, said paste comprising by weight:
about 53.37% tin powder;
about 0.48% xanthan gum;
about 13.53% zinc chloride;
about 3.41% muriatic acid;
about 1.74% n. butyl Cellosolve;
about 0.12% alkylphenoxypoly(oxyethylene)ethanol; and
about 27.34% aqueous solvent.

20. A solder paste composition suitable for use as an underlay for metallic solder when solder filling base metal braze joints to facilitate formation of the solder joint between the base metals, said solder paste comprising by weight:
about 52.46% tin powder;
about 0.51% xanthan gum;
about 14.38% zinc chloride;
about 3.63% muriatic acid;
about 1.85% n. butyl Cellosolve;
about 0.13% alkylphenoxypoly(oxyethylene)ethanol; and
about 27.05% aqueous solvent.

21. A process for formulating a solder paste composition suitable for use as an underlay for metallic solder when solder filling base metal braze joints to facilitate formation of the solder joint between the base metals, said process comprising the following steps:
a. adding from about 10.0 weight percent to about 40.0 weight percent of water and from about 0.25 weight percent to about 3.0 weight percent suspending agent into a suitably sized container;
b. mixing the water and suspending agent until a viscosity of a #4 Ford cup is obtained;
c. adding from about 1.0 weight percent to about 6.0 weight percent deoxidizing agent to the container;
d. adding from about 4.0 weight percent to about 15.0 weight percent flux to the container;
e. adding from about 0.5 weight percent to about 6.0 weight percent soil removing agent to the container
f. adding from about 0.1 weight percent to about 2.0 weight percent surfactant to the container;
g. adding from about 35.0 weight percent to about 85.0 weight percent substantially pure tin powder to the container; and
h. mixing the components of the above steps to form a paste.

* * * * *